United States Patent
Hiro et al.

(10) Patent No.: US 7,241,373 B2
(45) Date of Patent: Jul. 10, 2007

(54) NITROGEN TREATING METHOD

(75) Inventors: Naoki Hiro, Osaka (JP); Motoki Kouchi, Ora-gun (JP); Tomohito Koizumi, Ota (JP); Tsuyoshi Rakuma, Ora-gun (JP)

(73) Assignee: Sanyo Electric Co., Ltd., Moriguchi shi (JP)

( * ) Notice: Subject to any disclaimer, the term of this patent is extended or adjusted under 35 U.S.C. 154(b) by 435 days.

(21) Appl. No.: 10/308,166

(22) Filed: Dec. 3, 2002

(65) Prior Publication Data

US 2003/0132124 A1 Jul. 17, 2003

(30) Foreign Application Priority Data

Dec. 3, 2001 (JP) .............................. 2001-368718

(51) Int. Cl.
*C02F 1/461* (2006.01)
(52) U.S. Cl. ................... 205/688; 205/742; 205/746; 205/756; 205/759; 205/760; 423/352
(58) Field of Classification Search ................ 205/688, 205/742, 746, 756, 759, 760; 423/352
See application file for complete search history.

(56) References Cited

U.S. PATENT DOCUMENTS

| | | | | |
|---|---|---|---|---|
| 5,354,436 A | * | 10/1994 | Van Velzen et al. | 205/617 |
| 5,376,240 A | * | 12/1994 | Kaczur et al. | 205/617 |
| 6,558,643 B2 | * | 5/2003 | Blonigen et al. | 423/356 |
| 7,018,543 B2 | * | 3/2006 | Iseki et al. | 210/748 |

FOREIGN PATENT DOCUMENTS

EP 291330 * 11/1988

* cited by examiner

*Primary Examiner*—Arun S. Phasge
(74) *Attorney, Agent, or Firm*—Armstrong, Kratz, Quintos, Hanson & Brooks, LLP.

(57) ABSTRACT

There is provided a nitrogen treating method capable of treating nitrogen compounds efficiently. The method is a nitrogen treating method of treating nitrogen compounds in for-treatment water by electrolysis and performs a first treating step of producing ammonia from the nitrogen compounds in the for-treatment water by electrolysis using a cathode and an anode between which a cation exchange film is interposed so as to define a cathode reaction region and an anode reaction region, and a second treating step of removing the ammonia in the for-treatment water treated in the cathode reaction region by the first treating step.

18 Claims, 4 Drawing Sheets

NITROGEN TREATING METHOD

BACKGROUND OF THE INVENTION

1. Field of the Invention

The present invention relates to a nitrogen treating method for water to be treated (hereinafter, "water to be treated" will be referred to as "for-treatment water") which contains organic nitrogen, nitrite nitrogen, nitrate nitrogen, nitrate ions, and ammonia.

2. Description of the Related Art

It has heretofore been well known that existence of nitrogen compounds is one of causes of eutrophication of rivers and lakes. Further, the nitrogen compounds exist in domestic waste water and industrial waste water in large amounts and are difficult to eliminate, and there are currently no effective countermeasures against removal of the nitrogen compounds. In general, a biological treatment is carried out. In the biological treatment, ammonia nitrogen contained in for-treatment water is converted into nitrate nitrogen or a nitrogen gas by denitrifying bacteria. Accordingly, the biological treatment has a problem that a treatment time is significantly long and a treatment efficiency is significantly low.

Further, there is another problem that since the denitrifying bacteria are significantly influenced by ambient temperature environment, components contained in the for-treatment water, and the like, particularly during the winter season when temperature is low, their activities are lowered, and a resultant reduction in denitrifying action causes efficiency of the treatment of the for-treatment water to be unstable.

Under such circumstances, to solve the foregoing technical problems, there is a method of converting ammonia nitrogen, nitrite nitrogen or nitrate nitrogen into a nitrogen gas through oxidation or reduction by passing an electric current through for-treatment water.

However, the conventional method of treating nitrogen compounds by electrolysis has a problem that while ammonia is produced from nitrate ions at a cathode, a reverse reaction in which nitrate ions are produced from the ammonia produced at the cathode occurs at an anode, resulting in a decrease in a treatment speed. Along with this, there exists an inconvenience caused by a reduction in efficiency of nitrogen removal.

SUMMARY OF THE INVENTION

The present invention has been conceived to solve the technical problems of the prior art. An object of the present invention is to provide a nitrogen treating method for a nitrogen compound which can treat the nitrogen compound efficiently.

The nitrogen treating method of the present invention is a method of treating nitrogen compounds in for-treatment water by an electrochemical process. The method comprises a first treating step of producing ammonia from nitrogen compounds in for-treatment water by an electrochemical process using a cathode and an anode between which a cation exchange film is interposed to define a cathode reaction region and an anode reaction region, and a second treating step of removing ammonia in the for-treatment water treated in the cathode reaction region by the first treating step.

Further, in the nitrogen treating method of the present invention, as a metal material constituting the cathode, a conductive material containing or covered with an element in the group Ib or IIb of the periodic system is used.

Further, in the nitrogen treating method of the present invention, the ammonia removing treatment in the second treating step is a treatment in which air is passed through the for-treatment water so as to transfer ammonia contained in the for-treatment water into a gas phase.

Further, in the nitrogen treating method of the present invention, the ammonia removing treatment in the second treating step is a treatment in which the for-treatment water is heated so as to transfer ammonia contained in the for-treatment water into the gas phase.

Further, in the nitrogen treating method of the present invention, as a metal material constituting the cathode, a conductive material containing copper or a conductive material covered with a conductive material containing copper is used.

Further, in the nitrogen treating method of the present invention, as a metal material constituting the cathode, a conductive material containing copper and zinc or a conductive material covered with a conductive material containing copper and zinc is used.

Further, in the nitrogen treating method of the present invention, in the ammonia removing treatment in the second treating step, ammonia transferred into the gas phase is burned to be denitrified.

Further, in the nitrogen treating method of the present invention, in the second treating step, a catalyst containing a noble metal is added to the for-treatment water.

Further, in the nitrogen treating method of the present invention, the for-treatment water subjected to the ammonia removing treatment in the second treating step is denitrified by a chemical process by use of hypochlorous acid, ozone or active oxygen in a third treating step.

Further, in the nitrogen treating method of the present invention, the first treating step is carried out while the for-treatment water in the cathode reaction region is being stirred.

DETAILED DESCRIPTION OF THE PREFERRED EMBODIMENT

Figure 1:
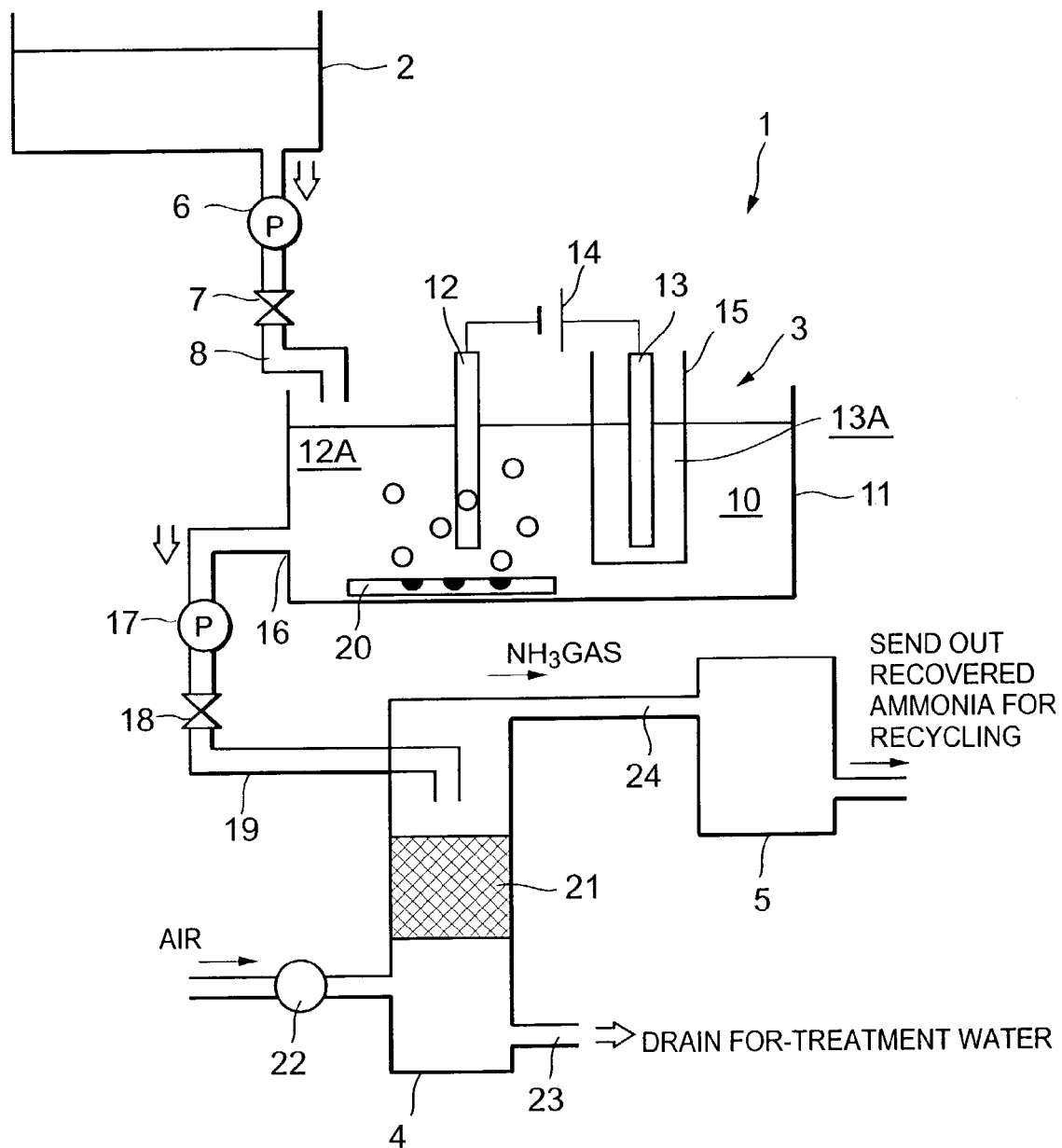
FIG. 1 is an explanatory diagram which schematically shows a nitrogen treating system for implementing a nitrogen treating method of the present invention.

Hereinafter, embodiments of the present invention will be described in detail with reference to the drawings. FIG. 1 is an explanatory diagram which schematically illustrates a nitrogen treating system 1 for implementing a nitrogen treating method of the present invention. The nitrogen treating system 1 in the present embodiment is a system for treating nitrogen compounds contained in, for example, domestic waste water and industrial waste water. The system 1 comprises a reservoir 2 for reserving waste water, an electrolyzer 3 which treats for-treatment water by an electrochemical process (electrolysis) as a first treating step, a stripping tower 4 which transfers ammonia in the for-treatment water treated by the electrolyzer 3 into a gas phase by an air stripping process as a second treating step, and an ammonia recovering device 5.

The reservoir 2 is intended for reserving for-treatment water such as domestic waste water or industrial waste water as described above. To the reservoir 2, the electrolyzer 3 is connected via a pipe 8 as transfer means which has a pump 6 and a magnetic valve 7. The pump 6 and the magnetic valve 7 are controlled by a controller which is not shown. Thereby, for-treatment water reserved in the reservoir 2 can be transferred to the electrolyzer 3.

The foregoing electrolyzer 3 comprises a treating vessel 11 having a treating chamber 10 therein. The treating vessel 11 takes a box shape or the like. In for-treatment water reserved in the treating chamber 10 in the treating vessel 11, a pair of electrodes which are at least partially immersed in the for-treatment water, i.e., a cathode 12 and an anode 13, are disposed confronting each other. Although a pair of electrodes are used in the present embodiment, a plurality of electrodes more than two electrodes may also be used. A power supply 14 is provided so as to energize the cathode 12 and the anode 13. The power supply 14 is turned on or turned off by a controller which is not shown.

The cathode 12 used in the present embodiment is made of an alloy or sintered body of copper and zinc, copper and iron, copper and nickel, or copper and aluminum as a conductive material containing an element in the group Ib or IIb of the periodic system or a conductive material such as copper, zinc or silver. Meanwhile, the anode 13 is an insoluble electrode made of insoluble metal such as platinum, iridium, palladium or an oxide thereof or is made of carbon.

In the treating chamber 10 in the present embodiment, a cylindrical cation exchange film 15 which completely surrounds the anode 13 in the treating chamber 10 is provided between the cathode 12 and the anode 13 so as to partition the interior of the treating chamber 10 into a cathode reaction region 12A in which the cathode 12 is disposed and an anode reaction region 13A in which the anode 13 surrounded by the cation exchange film 15 is present.

The pipe 8 connected to the reservoir 2 is communicated with the treating vessel 11. Thereby, for-treatment water in the reservoir 2 flows into the treating chamber 10. Further, in the lower portion of a side wall which forms the cathode reaction region 12A, an outlet 16 for discharging the for-treatment water in the treating chamber 10 into the foregoing stripping tower 4 is formed. The outlet 16 is communicated with the stripping tower 4 via a pipe 19 which has a pump 17 and a magnetic valve 18.

Further, reference numeral 20 denotes an air bubble generator as stirring means for stirring for-treatment water in the cathode reaction region 12A. The air bubble generator 20 is disposed at the bottom of the cathode reaction region 12A and may be controlled by the forgoing controller. The air bubble generator used as the stirring means in the present embodiment may be substituted by a stirring bar.

Next, a description will be given to the foregoing stripping tower 4. The stripping tower 4 is an apparatus for treating ammonia nitrogen by a conventionally known air stripping process. Incorporation of ammonia nitrogen into air which is a third gas phase component other than water and ammonia by means of the stripping tower 4 is already disclosed in pp. 168 to 174 of "1997: Unit Operations for Removal of Nitrogen and Phosphorus in Rational Technique for Treatment of Nitrogen and Phosphorus in Industrial Waste Water" in a research report on a technique for preventing eutrophication in a closed expanse of water, disclosed by Nippon Kikai Kougyo Rengo-Kai Syuppan in 1998.

In the stripping tower 4, for-treatment water treated by the treating vessel 11 of the electrolyzer 3 can be dispersed from the top of the stripping tower 4 toward its bottom via the pipe 19. Further, in the stripping tower 4, a filler 21 which is a ceramic raffischilling or saddle or plastic is disposed. In the lower portion of the stripping tower 4, a blower fan 22 for blowing outside air into the tower is provided.

Further, in the lower portion of the stripping tower 4, a pipe 23 for discharging for-treatment water passed through the filler 21 out of the tower is connected, and to the top of the stripping tower 4, an exhaust pipe 24 for discharging, as an exhaust gas, air blown into the tower by the blower fan 22 and gaseous ammonia (ammonia gas) transferred into the air is connected.

The exhaust pipe 24 is connected to the ammonia recovering device 5. The ammonia recovering device 5 is capable of recovering an ammonia gas as ammonium sulfate or ammonia water. The process of recovering ammonia is disclosed in pp. 173 and 174 of the foregoing report. That is, to recover an ammonia gas as ammonium sulfate in the ammonia recovering device 5, dilute sulfuric acid as an absorbent is caused to flow through an absorption tower which is not shown and brought into contact with an exhaust gas from the stripping tower 4 so as to absorb ammonia.

With the forgoing constitution, operations of the nitrogen treating system 1 in the present embodiment will be described. Firstly, for-treatment water reserved in the reservoir 2 such as domestic waste water or industrial waste water which contains nitrate nitrogen as a nitrogen compound is transferred, via the pipe 8, into the treating chamber 10 of the electrolyzer 3, when the magnetic valve 7 is opened and the pump 6 is operated by the controller which is not shown.

Since the magnetic valve 18 is closed and the pump 17 is not operated by the controller, the for-treatment water is kept in the cathode reaction region 12A in the treating chamber 10. At this time, in the anode reaction region 13A, similar for-treatment water or service water is kept as liquid which permits energization of the anode 13. Thereby, portions of the cathode 12 and anode 13 disposed in the treating chamber 10 are immersed in the for-treatment water.

Then, when the for-treatment water in the cathode reaction region 12A reaches a predetermined water level, the controller closes the magnetic valve 7 and stops operation of the pump 6. Further, as a first treating step, the controller turns on the power supply 14 so as to energize the cathode 12 and the anode 13. As a result, in the cathode reaction region 12A, nitrate ions including nitrate nitrogen in the for-treatment water undergo a reduction reaction due to electrolysis as an electrochemical process and are converted into nitrite ions including nitrite nitrogen (reaction A). Then, the nitrite ions resulting from the reduction reaction of the nitrate ions undergo a reduction reaction and are converted into ammonia including ammonia nitrogen (reaction B). The reactions A and B are represented as follows.

Reaction $A$: $NO_3^- + H_2O + 2e^- \rightarrow NO_2^- + 2OH^-$

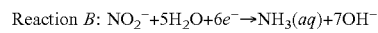
Reaction $B$: $NO_2^- + 5H_2O + 6e^- \rightarrow NH_3(aq) + 7OH^-$

Figure 2:
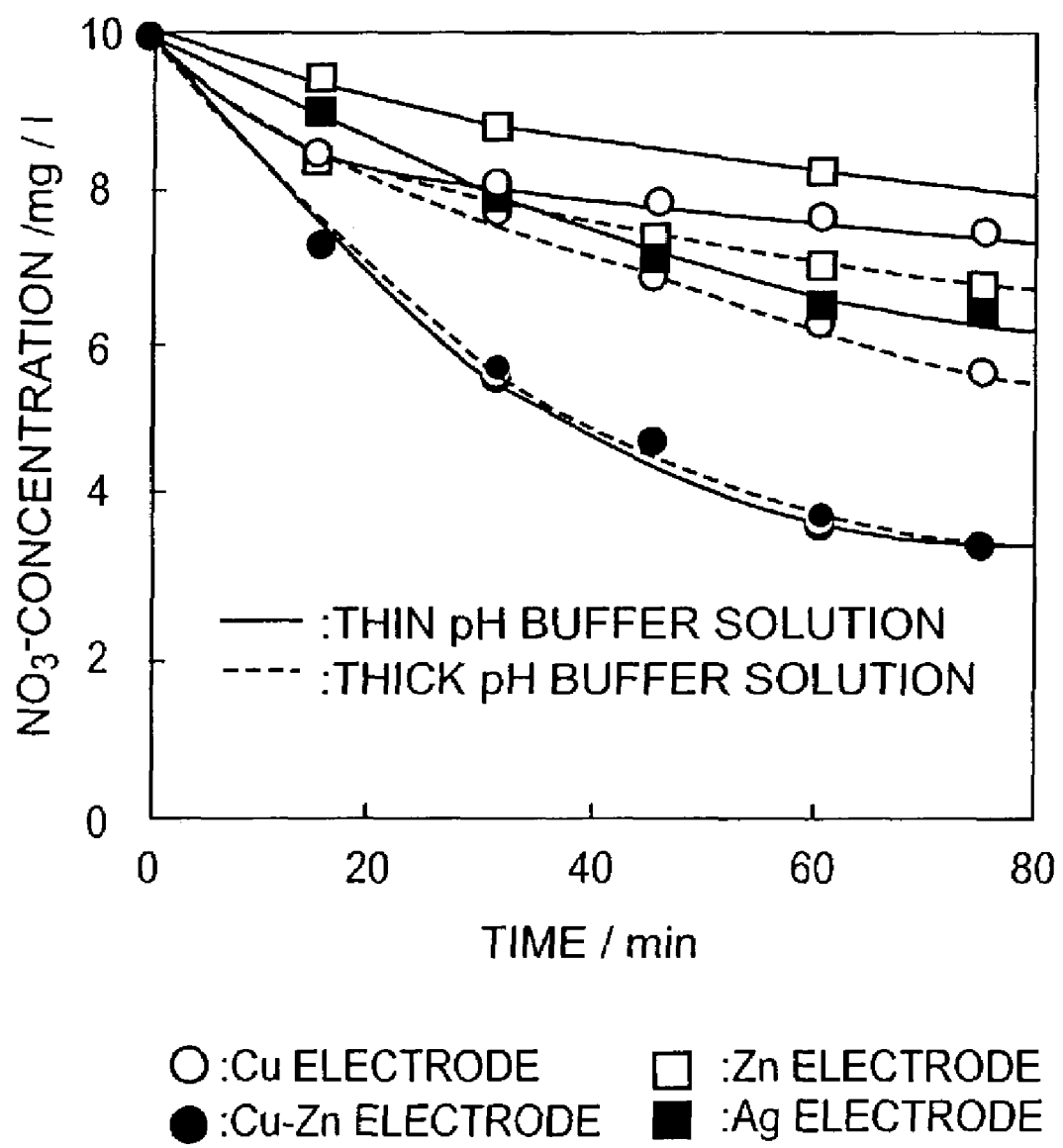
FIG. 2 is a diagram showing nitrate ion reducing capabilities of electrodes of different types.

A material constituting the cathode 12 in the present invention is a conductive material containing an element in the group Ib or IIb of the periodic system, i.e., a conductive material containing copper, silver, gold, zinc, cadmium or mercury. FIG. 2 shows changes in concentrations of the nitrate ions as nitrate nitrogen in the for-treatment water when a copper electrode, a zinc electrode, a silver electrode and a copper-zinc electrode comprising an alloy or sintered body of copper and zinc are used as the cathode 12. In FIG. 2, solid lines represent the results when the concentration of pH buffer solution (phosphoric acid buffer solution) added to keep the for-treatment water neutral is relatively low, while dotted lines represent the results when the concentration of the pH buffer solution is relatively high.

Referring to FIG. 2, it is understood that when the zinc electrode is used with the thin buffer solution, the concentration of the nitrate ions in the for-treatment water gently decreases from 10 mg/l with passage of time and reaches 8.0 mg/l upon passage of 80 minutes, while when the zinc electrode is used with the thick buffer solution, the concentration of the nitrate ions gently decreases from 10 mg/l with passage of time and reaches 7.0 mg/l upon passage of 80 minutes. It is also understood that when the silver electrode is used with the thin buffer solution, the concentration of the nitrate ions in the for-treatment water gently decreases from 10 mg/l with passage of time and reaches 6.5 mg/l upon passage of 80 minutes. It is also understood that when the copper electrode is used with the thin buffer solution, the concentration of the nitrate ions in the for-treatment water gently decreases from 10 mg/l with passage of time and reaches 7.8 mg/l upon passage of 80 minutes, while when the copper electrode is used with the thick buffer solution, the concentration of the nitrate ions gently decreases from 10 mg/l with passage of time and reaches 5.8 mg/l.

Meanwhile, when the copper-zinc electrode is used with the thin buffer solution, the concentration of the nitrate ions in the for-treatment water decreases from 10 mg/l with passage of time and reaches 3.2 mg/l upon passage of 80 minutes, while when the copper-zinc electrode is used with the thick buffer solution, the concentration of the nitrate ions decreases from 10 mg/l with passage of time and also reaches 3.2 mg/l upon passage of 80 minutes.

Thereby, it is understood that when electrolysis of the for-treatment water is carried out by use of a conductive material containing an element in the group Ib or IIb of the periodic system, i.e., a copper electrode, a zinc electrode or a silver electrode, as the cathode 12, the nitrate ions contained in the for-treatment water can be reduced to nitrite ions and then to ammonia ions, resulting in a reduction in the nitrate ions in the for-treatment water. It is also understood that with the thick pH buffer solution, the cathode 12 exhibits a better capability of reducing the nitrate ions than with the thin pH buffer solution.

Therefore, the reactions of reducing the nitrate ions (nitrate nitrogen) to nitrite ions (nitrite nitrogen) and to ammonia ions (ammonia nitrogen) can be accelerated, whereby time required for the reduction reactions can be shortened and low-concentration nitrogen compounds can be removed.

Particularly, when a conductive material containing copper, i.e., a copper-zinc electrode, is used as the cathode 12, the reactions of reducing the nitrate ions (nitrate nitrogen) in the for-treatment water to nitrite ions (nitrite nitrogen) and to ammonia ions (ammonia nitrogen) can be further accelerated, whereby the time required for the reduction reactions can be further shortened and the low-concentration nitrogen compounds can be further removed. Further, as compared with the foregoing copper electrode, zinc electrode and silver electrode, the copper-zinc electrode exhibits high catalysis without being influenced by the concentration of the pH buffer solution and also exhibits a good reducing capability even within a neutral-to-alkaline range in particular. Accordingly, the copper-zinc electrode is advantageous in an ammonia treatment in the air stripping process which will be described in detail later. Thus, the reaction of reducing the nitrate ions can be accelerated even when the for-treatment water is neutral or alkaline.

Further, in the present embodiment, the cathode reaction region 12A and the anode reaction region 13A are partitioned by the cation exchange film 15. Thereby, it can be prevented that negatively charged nitrate ions in the cathode reaction region 12A are attracted to the anode 13 instead of moving to the cathode 12 and efficiency of the reduction reaction of the nitrate ions is thereby significantly decreased, and ammonia can be produced from the nitrate ions with high efficiency.

Further, the controller in the present embodiment operates the air bubble generator 20 as the stirring means so as to stir the for-treatment water in the cathode reaction region 12A, while energizing the cathode 12 and the anode 13. As a result, nitrate nitrogen, particularly negatively charged nitrate ions, contained in the for-treatment water in the cathode reaction region 12A make aggressive contact with the cathode 12, frequency of contact of the nitrate ions with the cathode 12 increases as compared with when the for-treatment water is not stirred, and production of ammonia from the foregoing nitrate ions can be promoted.

When the cathode 12 and the anode 13 are energized, the reduction reaction of reducing the nitrate ions to ammonia by the cathode 12 occurs in the cathode reaction region 12A as described above. Meanwhile, in the anode reaction region 13A, hypochlorous acid or ozone or active oxygen is produced from the surface of the anode 13. Therefore, hypochlorous acid or ozone or active oxygen is contained in the for-treatment water or service water present in the anode reaction region 13A.

Then, after the controller energizes the cathode 12 and the anode 13 for at least a predetermined time period so as to convert almost all of nitrate nitrogen present in the cathode reaction region 12A to ammonia nitrogen, it stops energizing the cathode 12 and the anode 13, opens the magnetic valve 18, and operates the pump 17, thereby completing the first treating step and transferring the for-treatment water in the treating chamber 10 to the foregoing stripping tower 4.

The for-treatment water transferred into the stripping tower 4 contains ammonia nitrogen since it has been subjected to the treatment of reducing nitrate nitrogen to ammonia nitrogen in the electrolyzer 3. At this time, ammonia to be treated by the air stripping process in the stripping tower 4 must exist as free ammonia ($NH_3$) at room temperature. Thus, when a pH buffer solution has been added to the for-treatment water in the electrolyzer 3 so as to adjust the pH of the for-treatment water to a neutral range, such a pH regulator as sodium hydroxide or calcium hydroxide is added to the for-treatment water when the for-treatment water is transferred to the stripping tower 4 so as to adjust the pH of the for-treatment water to an alkaline range, i.e., a pH of at least 10.

However, when the for-treatment water is neutral before the treatment and a pH buffer solution is not added to the for-treatment water in the electrolyzer 3, the for-treatment water becomes alkaline without adding a pH regulator thereto due to a large amount of hydroxide ions produced by the reactions A and B caused by the electrolysis of the for-treatment water. Further, when a conductive material containing copper, i.e., a copper-zinc electrode, is used as the cathode 12 as described above, the reaction of reducing nitrate nitrogen to ammonia nitrogen is further accelerated, so that the for-treatment water can be rendered more alkaline.

Then, as a second treating step, the for-treatment water is dispersed from the top of the stripping tower 4 toward its bottom, flows down on the surface of the filler 21 provided in the tower, and reaches the lower portion of the tower. At this time, the blower fan 22 provided in the lower portion of the tower is operated so as to blow air into the tower. Thereby, the for-treatment water flowing down on the surface of the filler 21 makes contact with the air blown into the tower, whereby ammonia in the for-treatment water is transferred into a gas phase.

That is, ammonia in the for-treatment water is transferred into the gas phase (air) when the partial pressure of ammonia is reduced in accordance with Henry's law. At this time, when the cathode 12 used in the first treating step is a copper-zinc electrode, the reaction of reducing nitrate nitrogen to ammonia nitrogen is further accelerated in the treating step, so that the for-treatment water is rendered more alkaline. Accordingly, the treatment of transferring ammonia in the for-treatment water into the gas phase in the second treating step is further accelerated.

Further, when air is brought into contact with the for-treatment water flowing down on the surface of the filler 21, the for-treatment water may be heated. Thereby, transfer of ammonia contained in the for-treatment water into the gas phase can be further accelerated, and the efficiency of a treatment of ammonia nitrogen can be increased.

In the present embodiment, to transfer ammonia in the for-treatment water into the gas phase, air is blown into the tower, and the for-treatment water is heated. Alternatively, ammonia in the for-treatment water may be transferred into the gas phase, only by heating the for-treatment water, i.e., without blowing air into the tower.

Then, an exhaust gas containing ammonia transferred into the gas phase in the stripping tower 4 as described above, i.e., an ammonia gas, is recovered in the ammonia recovering device 5 via the exhaust pipe 24 connected to the top of the tower.

That is, in the ammonia recovering device 5, dilute sulfuric acid as an absorbent is caused to flow through an absorption tower which is not shown and brought into contact with the exhaust gas containing the ammonia gas from the stripping tower 4 so as to absorb ammonia. Thereby, the ammonia gas is recovered as ammonium sulfate. Consequently, additional ammonia is collected and can be recycled.

The ammonia-gas-containing exhaust gas discharged from the stripping tower 4 may be burned so as to denitrify ammonia into a nitrogen gas. Thereby, the efficiency of treating ammonia can be increased.

As described above, since for-treatment water containing ammonia produced with high efficiency in the cathode reaction region 12A in the first treating step is subjected to a treatment as described above in which ammonia is removed from the for-treatment water in the second treating step, nitrate nitrogen and ammonia nitrogen can be removed from the for-treatment water efficiently.

Further, in the present invention, as compared with a conventional case in which a nitrogen compound is treated by use of a biological treatment vessel, the treatment of nitrogen can be achieved by an electrochemical process and a chemical process. Accordingly, control of the temperature of denitrifying bacteria and the like can be obviated, and the efficiency of the treatment can be increased significantly.

Meanwhile, for-treatment water resulting from transferring ammonia into the gas phase is discharged from the lower portion of the stripping tower 4 to the outside via the pipe 23. The for-treatment water may be transferred into a post-treatment vessel which is not shown and subjected to a third treating step in which hypochlorous acid or ozone or active oxygen is added to the for-treatment water reserved in the post-treatment vessel so as to denitrify residual ammonia by a chemical process. The hypochlorous acid, ozone or active oxygen used in this case may be the hypochlorous acid, ozone or active oxygen which is produced in the anode reaction region 13A in the forgoing electrolyzer 3.

That is, ammonia remaining in the for-treatment water causes an ammonia oxidation-denitrification reaction with hypochlorous acid or ozone or active oxygen chemically (or by a chemical process) so as to produce a nitrogen gas (reaction C). The reaction C is represented by the following reaction formulae.

Reaction $C$: $2NH_3(aq) + 3(O) \rightarrow N_2\uparrow + 3H_2O$ 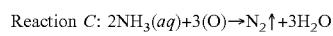

$NaCl \rightarrow Na^+ + Cl^-$ 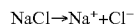

$2Cl^- \rightarrow Cl_2 + 2e^-$ 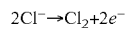

$Cl_2 + H_2O \rightarrow HClO + HCl$ 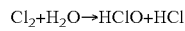

$2NH_3 + 3HClO \rightarrow N_2\uparrow + 3HCl + 3H_2O$ 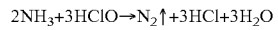

Thus, when the for-treatment water subjected to the ammonia removing treatment in the second treating step is treated with hypochlorous acid or ozone or active oxygen by a chemical process, removal of ammonia can be carried out with higher accuracy, and it can be substantially avoided that ammonia remains in the for-treatment water.

Further, since ammonia can be treated stepwise, the amount of energy consumed by heating can be decreased, and the amount of hypochlorous acid, ozone or active oxygen used for removing residual ammonia can also be decreased, so that nitrogen compounds in the for-treatment water can be treated with high efficiency.

In addition, bacteria and the like remaining in the for-treatment water can also be killed by hypochlorous acid, ozone or active oxygen, so that the for-treatment can be drained in a state more suited to the environment.

In the present embodiment, for-treatment water treated in the first treating step is treated by the air stripping process so as to remove ammonia in the second treating step. Alternatively, a catalyst containing a noble metal such as platinum may be added to the for-treatment water treated in the first treating step so as to decompose ammonia in the for-treatment water into water and a nitrogen gas.

Thereby, ammonia contained in the for-treatment water can be decomposed into a nitrogen gas with high efficiency, and the efficiency of the treatment can be increased.

In addition, in the treatment, when the for-treatment water is heated to a predetermined temperature, the decomposition reaction of ammonia contained in the for-treatment water can be further accelerated, so that the efficiency of the treatment can be further increased.

Figure 3:
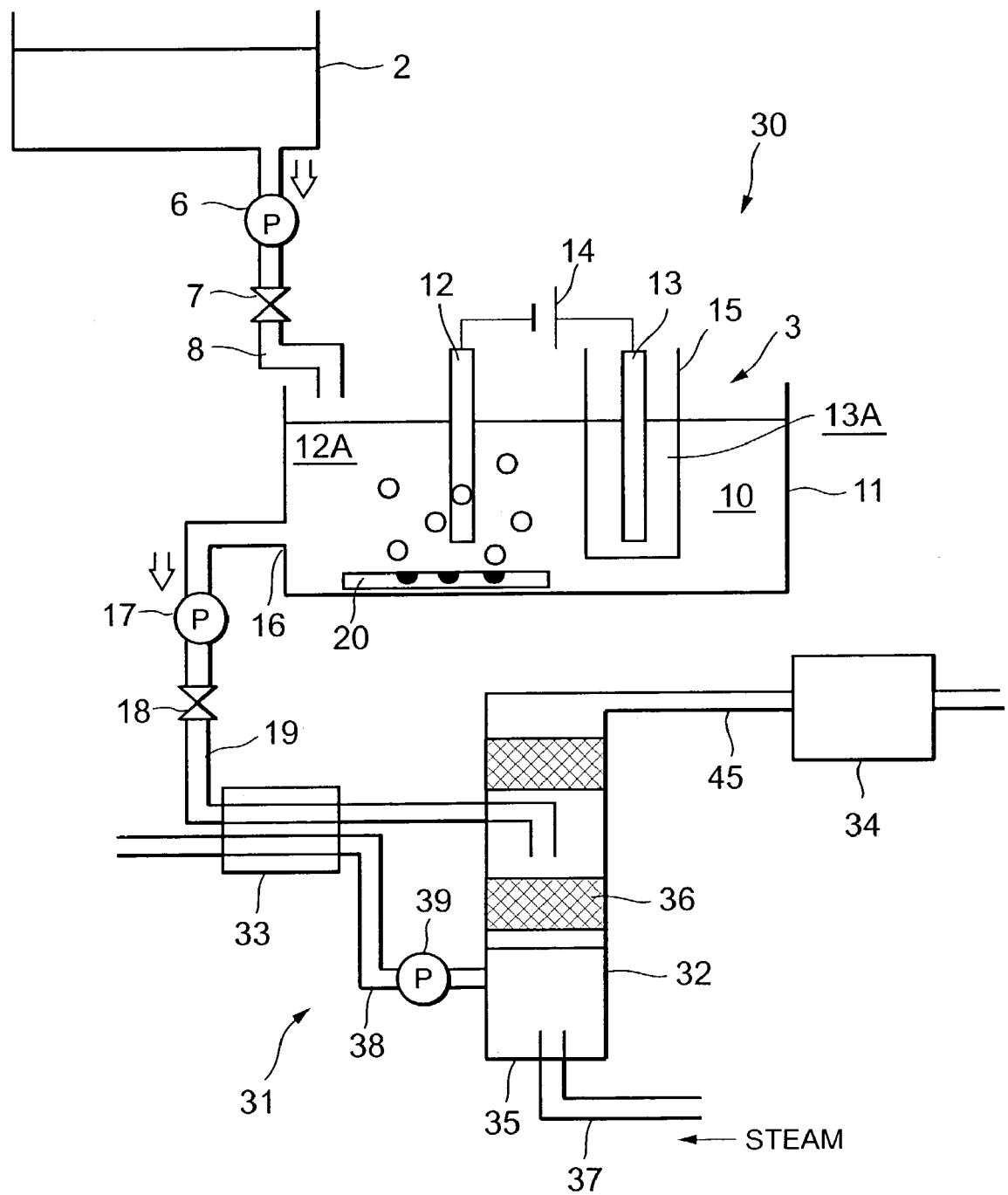
FIG. 3 is an explanatory diagram which schematically shows a nitrogen treating system of another embodiment.

Next, a nitrogen treating method as another embodiment of the present invention will be described with reference to FIG. 3. FIG. 3 is an explanatory diagram which schematically shows a nitrogen treating system 30 as another embodiment of the present invention. In FIG. 3, constituents indicated by the same reference numerals as used in FIG. 1 have the same or similar functions as constituents in FIG. 1 indicated by the reference numerals. In the nitrogen treating system 30 in the present embodiment, a first treating step is constituted by an electrolyzer 3 which is the same as that used in the foregoing embodiment, and a second treating step in which for-treatment water treated in the first treating step is further treated is constituted by an ammonia treating device 31 which transfers ammonia in the for-treatment water into a gas phase by a distillation-concentration process. The ammonia distillation-concentration process is disclosed on pp. 174 to 177 of the foregoing report.

The ammonia treating device 31 comprises an ammonia concentrator 32, a heat exchanger 33, and a condenser 34. The ammonia concentrator 32 comprises an ammonia separation tower 35 in which a plurality of fillers 36 having a large specific surface area are laminated. To the middle portion of the separation tower 35, the foregoing pipe 19 for transferring for-treatment water treated in the electrolyzer 3 in the first treating step is connected. In the pipe 19, the heat exchanger 33 for exchanging heat with high-temperature for-treatment water discharged from the ammonia concentrator 32 to be described later is disposed.

To the bottom of the separation tower 35, a steam feed pipe 37 for allowing steam to flow into the tower toward its top is connected. Further, to the lower portion of the separation tower 35, a distributing water pipe 38 for discharging for-treatment water which has flown down from the fillers 36 out of the tower is connected. Reference numeral 39 in FIG. 3 denotes a pump for sending for-treatment water discharged from the lower portion of the ammonia concentrator 32 to the heat exchanger 33.

Further, to the top of the separation tower 35, an exhaust pipe 45 for discharging, as an exhaust gas, steam (air) blown into the tower by the steam feed pipe 37 and gaseous ammonia (ammonia gas) transferred into the air is connected. The exhaust pipe 45 is connected to the foregoing condenser 34. The condenser 34 leads steam reaching the top of the separation tower 35 to the outside of the tower 35, concentrates the steam by cooling it, and recovers the resulting ammonia water.

With the foregoing constitution, operations of the nitrogen treating system 30 in the present embodiment will be described. Firstly, the first treating step is carried out in the electrolyzer 3 as in the case of the foregoing embodiment. In the first treating step, for-treatment water containing nitrogen compounds reduced to ammonia nitrogen is transferred into the ammonia concentrator 32 via the pipe 19 and the heat exchanger 33.

The for-treatment water transferred into the ammonia concentrator 32 is dispersed from the top of the fractionating tower 35 toward its bottom, flows down on the surfaces of the fillers 36 disposed in the tower, and reaches the lower portion of the tower. At this time, steam is blown into the tower from the steam feed pipe 37 disposed at the bottom of the tower. The steam is water vapor. The water vapor not only serves as a heat source for heating the for-treatment water but also reduces the partial pressure of ammonia to be distilled so as to lower the boiling point.

Thereby, the for-treatment water dispersed in the tower makes contact with the steam on the surfaces of the fillers 16 and reaches the lower portion of the tower with its temperature being increased. The heated for-treatment water evaporates and becomes gas and is separated into condensed water and steam containing ammonia in high concentration. Then, the steam containing ammonia in high concentration is discharged out of the tower via the exhaust pipe 45 and passes through the foregoing condenser 34 so as to be recovered as ammonia water.

On the other hand, the for-treatment water which has reached the lower portion of the tower as condensed water flows into the heat exchanger 33 via the distributing water pipe 38 through operation of the pump 39. As described above, the for-treatment water flown into the heat exchanger 33 has been heated to high temperatures by the steam. Thus, the for-treatment water is discharged out of the heat exchanger after exchanging heat with for-treatment water sent from the electrolyzer 3 via the pipe 19 connected to the heat exchanger 33. Thereby, for-treatment water transferred from the electrolyzer 3 is heated before reaching the ammonia concentrator 32.

Thus, in the present embodiment as well, for-treatment water containing ammonia is heated efficiently, ammonia can be treated with high efficiency, and the efficiency of treating nitrogen compounds in for-treatment water can be increased.

Figure 4:
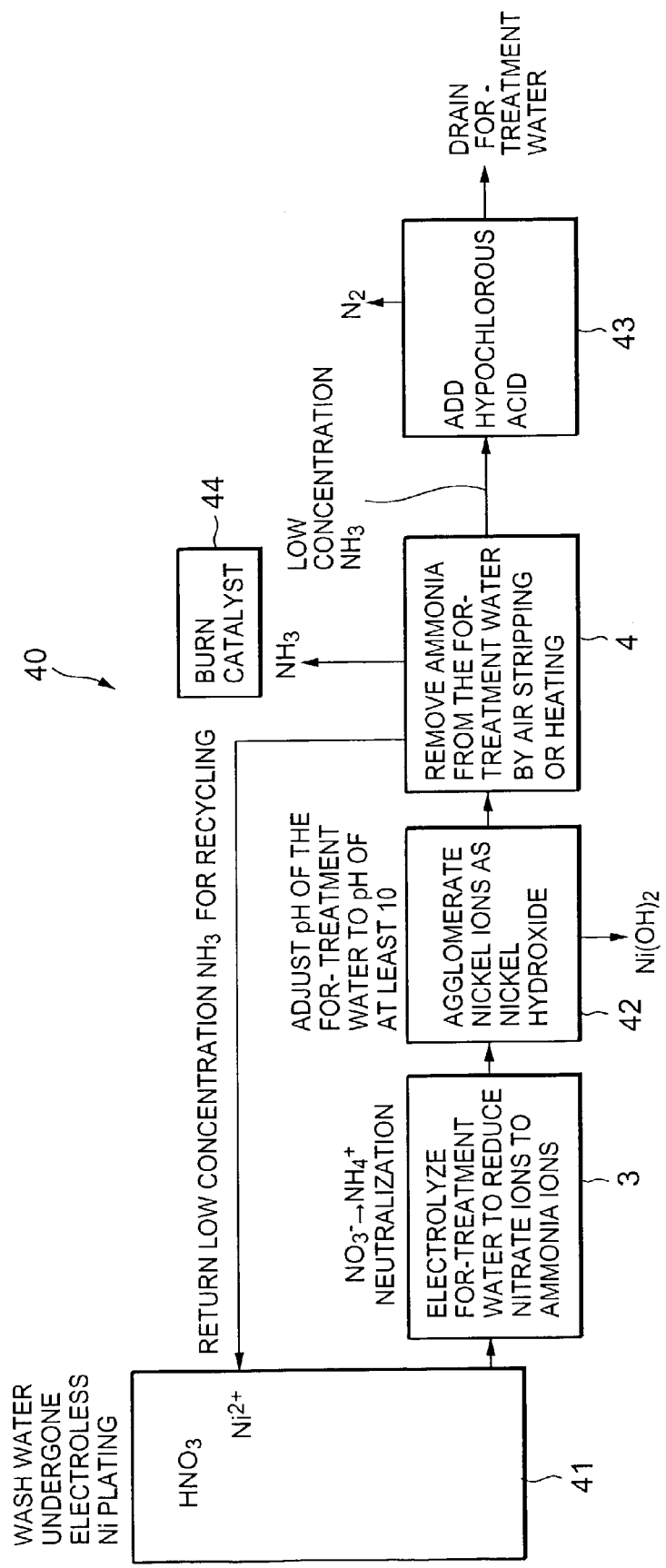
FIG. 4 is an explanatory diagram which schematically shows a nitrogen treating system of still another embodiment.

Next, a nitrogen treating system 40 in a case where for-treatment water is wash water which has undergone electroless nickel plating as an example of industrial waste water will be described with reference to FIG. 4. In FIG. 4, constituents indicated by the same reference numerals as used in FIG. 1 have the same or similar functions as constituents in FIG. 1 indicated by the reference numerals. For-treatment water to be treated in the nitrogen treating system 40 contains nickel ions, nitric acid and the like and is reserved in a reservoir 41. The nitrogen treating system 40 comprises an electrolyzer 3 which treats for-treatment water by an electrochemical process (electrolysis) as a first treating step as in the foregoing nitrogen treating system 1, a pH adjusting vessel 42 for adjusting the pH of the for-treatment water treated in the electrolyzer 3, a stripping tower 4, and a post-treatment vessel 43 which performs the foregoing third treating step.

As in the case of the foregoing embodiment, for-treatment water to be treated in the nitrogen treating system 40 is electrolyzed in the electrolyzer 3 in the first treating step, and nitrate ions contained in the for-treatment water are reduced to ammonia ions. The for-treatment water in the present embodiment has pH preset to fall within an acidic range. Therefore, in the pH adjusting vessel 42, a pH regulator such as sodium hydroxide or calcium hydroxide is added to the for-treatment water treated in the electrolyzer 3 so as to adjust the pH of the for-treatment water to an alkaline range, i.e., a pH of at least 10. Upon adjustment of the pH of the for-treatment water to the alkaline range, nickel ions contained in the for-treatment water are agglomerated as nickel hydroxide.

The for-treatment water adjusted to be alkaline in the pH adjusting vessel 42 is transferred into the foregoing stripping tower 4 and subjected to a second treating step in which ammonia is removed from the for-treatment water by an air stripping process as described above. That is, an exhaust gas containing ammonia transferred into a gas phase in the stripping tower 4, i.e., an ammonia gas, is transferred to a catalyst decomposition apparatus 44 via an exhaust pipe connected to the top of the tower. The catalyst decomposition apparatus 44 is constituted based on a method which is already disclosed on pp. 161 to 166 of the foregoing report.

In the catalyst decomposition apparatus 44, the ammonia-gas-containing exhaust gas is firstly heated to a predetermined temperature and then brought into contact with a catalyst composed of, for example, titanium oxide or a platinum-palladium alloy, so as to convert ammonia into water and a nitrogen gas.

A portion of the exhaust gas is sent back to the foregoing reservoir 41 in a state of low-concentration ammonia so as to be recycled.

Meanwhile, residual ammonia which could not be removed in the stripping tower 4 and remains dissolved in for-treatment water to be discharged is transferred, together with the for-treatment water to be discharged from the lower portion of the stripping tower 4, to the post-treatment vessel 43 via the distributing water pipe. In the third treating step, hypochlorous acid, ozone or active oxygen is added to the for-treatment water reserved in the post-treatment vessel, and the residual ammonia is denitrified by a chemical process.

Thus, when for-treatment water subjected to the ammonia removing treatment in the second treating step is treated with hypochlorous acid, ozone or active oxygen by the chemical process, ammonia can be removed with higher accuracy, and it can be substantially avoided that ammonia remains in for-treatment water to be discharged.

Further, since ammonia can be treated stepwise, the amount of energy consumed by heating can be decreased, and the amount of hypochlorous acid, ozone or active oxygen used for removing residual ammonia can also be decreased, so that nitrogen compounds in for-treatment water can be treated with high efficiency.

As described in detail above, according to a nitrogen treating method of the present invention, in a first treating step, ammonia is produced from nitrogen compounds in for-treatment water by an electrochemical process using a cathode and an anode between which a cation exchange film is interposed to define a cathode reaction region and an anode reaction region. Thereby, occurrence of a reverse reaction in which nitrate ions are produced from the ammonia produced in the cathode reaction region at the anode can be inhibited, and ammonia nitrogen can be produced from nitrate nitrogen in the for-treatment water with high efficiency.

Further, in a second treating step, ammonia is removed from ammonia nitrogen produced with high efficiency in the cathode reaction region in the first treating step. Thereby, nitrate nitrogen and ammonia nitrogen can be removed from the for-treatment water efficiently.

Still further, as compared with a conventional case in which a nitrogen compound is treated by use of a biological treatment vessel, a treatment of nitrogen can be achieved by an electrochemical process and a chemical process. Thereby, control of the temperature of bacteria and the like can be obviated, and the efficiency of the treatment can be increased significantly.

Further, according to the present invention, as a metal material constituting the cathode, a conductive material containing or covered with an element in the group Ib or IIb of the periodic system is used. Thereby, reactions of reducing nitrate nitrogen in the for-treatment water to nitrite nitrogen and then to ammonia nitrogen can be accelerated, so that time required for the reduction reactions can be shortened and low-concentration nitrogen compounds can be removed.

Further, according to the present invention, in the second treating step, air is passed through the for-treatment water rendered alkaline by the electrochemical process in the first treating step. Thereby, ammonia in the for-treatment water can be transferred into a gas phase easily, and ammonia nitrogen can be removed from the for-treatment water efficiently.

Further, the ammonia gas transferred into the gas phase can be recovered independently so as to be recycled.

Further, according to the present invention, in the second treating step, the for-treatment water rendered alkaline by the electrochemical process in the first treating step is also heated. Thereby, ammonia in the for-treatment water can be transferred into the gas phase more easily, and ammonia nitrogen can be removed from the for-treatment water more efficiently.

Further, the ammonia gas transferred into the gas phase can be recovered independently so as to be recycled.

Further, according to the present invention, as a metal material constituting the cathode, a conductive material containing copper or a conductive material covered with a conductive material containing copper is used. Thereby, the reactions of reducing nitrate nitrogen in the for-treatment water to nitrite nitrogen and then to ammonia nitrogen can be further accelerated, so that the time required for the reduction reactions can be shortened and the low-concentration nitrogen compounds can be removed.

Further, when the metal material constituting the cathode contains copper, the for-treatment water can be rendered more alkaline by the electrochemical process, and transfer of ammonia in the for-treatment water into the gas phase in the second treating step can be further accelerated.

Further, according to the present invention, as a metal material constituting the cathode, a conductive material containing copper and zinc or a conductive material covered with a conductive material containing copper and zinc is used. Thereby, the reactions of reducing nitrate nitrogen in the for-treatment water to nitrite nitrogen and then to ammonia nitrogen can be further accelerated, so that the time required for the reduction reactions can be shortened and the low-concentration nitrogen compounds can be removed.

Further, when the metal material constituting the cathode contains copper and zinc, the for-treatment water can be rendered more alkaline by the electrochemical process, and transfer of ammonia in the for-treatment water into the gas phase in the second treating step can be further accelerated.

Further, according to the present invention, in the ammonia removing treatment in the second treating step, ammonia transferred into the gas phase is burned to be denitrified. Thereby, ammonia can be converted into a nitrogen gas easily, and the efficiency of the treatment of ammonia can be increased.

Further, according to the present invention, in the second treating step, a catalyst containing a noble metal is added to the for-treatment water. Thereby, ammonia contained in the for-treatment water can be converted into a nitrogen gas with high efficiency.

Further, according to the present invention, the for-treatment water subjected to the ammonia removing treatment in the second treating step is denitrified with hypochlorous acid, ozone or active oxygen by a chemical process in a third treating step. Thereby, even ammonia in the for-treatment water containing ammonia in low concentration can be treated by the denitrification reaction with high efficiency. In addition, the for-treatment water treated in the second treating step can be sterilized with hypochlorous acid, ozone or active oxygen in the third treating step.

Further, according to the nitrogen treating method of the present invention, the first treating step is carried out while the for-treatment water in the cathode reaction region is stirred. Thereby, frequency of contact of nitrate nitrogen present in the cathode reaction region, negatively charged nitrate ions in particular, with the cathode increases, and production of ammonia from the nitrate ions can be further promoted.

What is claimed is:

1. A nitrogen treating method of treating nitrogen compounds in for-treatment water by an electrochemical process, the method comprising:
   a first treating step of providing a vessel having a cathode and an anode between which a cation exchange film is interposed so as to define a cathode reaction region and an anode reaction region, a second treating step of introducing into the vessel for-treatment water and a pH buffer solution, to keep the for-treatment water neutral, so that ammonia can be produced and remain in the cathode reaction region, and a third treating step of removing ammonia in the for-treatment water treated in the cathode reaction region by the second treating step.

2. The method of claim 1, wherein as a metal material constituting the cathode, a conductive material containing or covered with an element in the group Ib or Ib of the periodic system is used.

3. The method of claim 1 or 2, wherein the for-treatment water subjected to the ammonia removing treatment in the third treating step is denitrified by a chemical process by use of hypochlorous acid, ozone or active oxygen in a third treating step.

4. The method of claim 1 or 2, wherein the second treating step is carried out while the for-treatment water in the cathode reaction region is being stirred.

5. The method of claim 2, wherein the ammonia removing treatment in the third treating step is a treatment in which air is passed through the for-treatment water so as to transfer ammonia contained in the for-treatment water into a gas phase.

6. The method of claim 5, wherein as a metal material constituting the cathode, a conductive material containing copper or a conductive material covered with a conductive material containing copper is used.

7. The method of claim 5, wherein as a metal material constituting the cathode, a conductive material containing copper and zinc or a conductive material covered with a conductive material containing copper and zinc is used.

8. The method of claim 5, wherein in the ammonia removing treatment in the third treating step, ammonia transferred into the gas phase is burned to be denitrified.

9. The method of claim 2, wherein the ammonia removing treatment in the third treating step is a treatment in which the for-treatment water is heated so as to transfer ammonia contained in the for-treatment water into the gas phase.

10. The method of claim 9, wherein in the third treating step, a catalyst containing a noble metal is added to the for-treatment water.

11. The method of claim 2, wherein the for-treatment water subjected to the ammonia removing treatment in the third treating step is denitrified by a chemical process by use of hypochlorous acid, ozone or active oxygen in a third treating step.

12. The method of claim 2, wherein the second treating step is carried out while the for-treatment water in the cathode reaction region is being stirred.

13. The method of claim 1, wherein the ammonia removing treatment in the third treating step is a treatment in which air is passed through the for-treatment water so as to transfer ammonia contained in the for-treatment water into a gas phase.

14. The method of claim 13, wherein as a metal material constituting the cathode, a conductive material containing copper or a conductive material covered with a conductive material containing copper is used.

15. The method of claim 13, wherein as a metal material constituting the cathode, a conductive material containing copper and zinc or a conductive material covered with a conductive material containing copper and zinc is used.

16. The method of claim 13, wherein in the ammonia removing treatment in the third treating step, ammonia transferred into the gas phase is burned to be denitrified.

17. The method of claim 1, wherein the ammonia removing treatment in the third treating step is a treatment in which the for-treatment water is heated so as to transfer ammonia contained in the for-treatment water into the gas phase.

18. The method of claim 17, wherein in the third treating step, a catalyst containing a noble metal is added to the for-treatment water.

* * * * *